July 14, 1964  J. C. MUNDAY ETAL  3,141,113
PROCESS OF CONTROLLING ELECTROSTATIC CHARGES
Filed Jan. 26, 1961
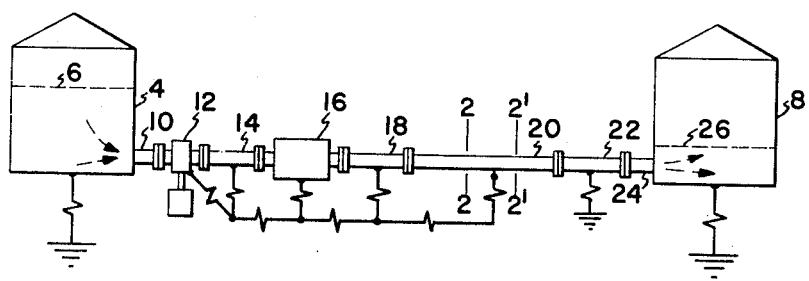
FIG. 1
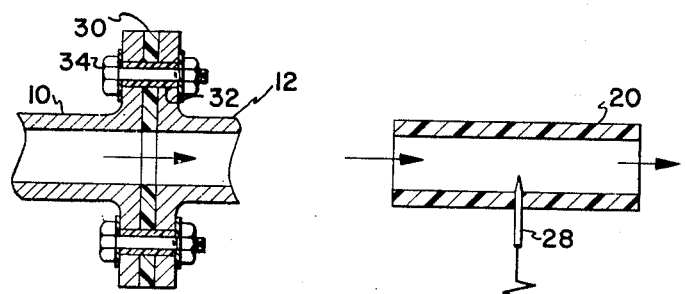
FIG. 3
FIG. 2
John C. Munday
James A. Wilson   Inventors
By *Richard L. Cannaday*
Patent Attorney 3,141,113
PROCESS OF CONTROLLING ELECTROSTATIC
CHARGES
John C. Munday, Cranford, and James A. Wilson, Stanhope, N.J., assignors to Esso Research and Engineering Company, a corporation of Delaware
Filed Jan. 26, 1961, Ser. No. 85,058
8 Claims. (Cl. 317—2)

The present invention relates to the reduction of electrostatic charges in liquids. More particularly, it relates to practical methods of reducing electrostatic charges produced in the transportation and handling of flammable liquids, so as to minimize the danger of explosions and fires.

This application is a continuation-in-part of an application Serial No. 858,840 filed in the United States Patent Office on December 11, 1959, and now abandoned.

In the recent past, many explosions attributed to static electricity have occurred during the handling of flammable liquids particularly petroleum products. These explosions have taken place in tank trucks, aircraft fuel tanks, tanker compartments, blending tanks, and storage tanks during operations such as the filling of tanks, blending of liquids, water displacement of pipelines, gauging, loading of tankers, and refueling of jet fighters. The products involved in these explosions include turbo jet fuel, kerosene, gasoline, heating oil, and hot asphalt. Recently, a larger proportion of accidents has been caused by hydrocarbon fuels which form flammable vapor-air mixtures at ambient temperatures, such as JP-4 jet fuels. The danger of explosions from static electricity is not limited to hydrocarbons, however. Static electricity is produced in large amounts by other flammable liquids such as oxygen- and sulfur-containing solvents.

Static electricity is produced when a liquid moves past the surface of a solid or another liquid. For example, liquids become charged by static electricity when they are pumped through pipes or filters, or agitated in tanks, or when they are sprayed into another liquid, or when a solid or liquid material rises or settles through them. The phenomenon has been known for more than 100 years, Michael Faraday being an early researcher in the field (Faraday's Experimental Researches in Electricity, London, vol. II, 1844). The mechanism whereby static electricity is produced by a liquid is believed to involve the adsorption of ions of one polarity (e.g. positive ions) on the surface, with the ions of opposite polarity (e.g. negatvie ions) remaining in the liquid and moving downstream with it. The flow of ions with the liquid stream constitutes an electric current, known as "streaming current," and this current causes a difference in electrostatic potential, known as "streaming potential." The overall process involving the adsorption of ions of one polarity and the transport of ions of the other polarity, is called "charge separation."

Extremely high potentials are produced by the transport of very small quantities of ions. For example, if the ions have a molecular weight of 100, only $10^{-9}$ mole of ions need be transported into a spherical tank of about 10 meters radius in order to raise the potential of the tank to about 100,000 volts.

The magnitude of the streaming current depends on the concentration of the ions in the liquid. Very pure hydrocarbons produce relatively small streaming currents because ions are so scarce that little charge separation can take place, but impure hydrocarbons containing high concentrations of ions produce large streaming currents. For example, using electrical conductivity as a measure of ion concentration, a hydrocarbon having a conductivity of about $1\times10^{-14}$ mho/cm. may give a streaming current of about $1\times10^{-10}$ amperes, but if the conductivity is $1\times10^{-12}$ mho/cm., the current may be more than $1\times10^{-7}$ amperes. On the other hand, at a still higher conductivity such as $1\times10^{-10}$ mho/cm. the streaming current may be less, for the reason that now the conductivity is so high that the counter-flow of current upstream becomes appreciable. The driving force for this counter-current is, of course, the streaming potential.

It should not be assumed that streaming current can be correlated with electrical conductivity. Both the nature of the ionic constituents and the system itself are involved. It is true that as the conductivity of a liquid is increased by the addition of a particular ionizing constituent, a smooth conductivity-current curve may be obtained. However, with another ionizing constituent, a different curve, even having polarity reversals, may be obtained. Also, in one system the streaming current may fall off to zero when the conductivity is increased to $1\times10^{-12}$ mho/cm., while with other systems the streaming current will be very high even at a conductivity of $1\times10^{-7}$ mho/cm. Systems wherein the liquid stream is discontinuous, such as in the overshot filling of tanks or wherever sprays are formed, produce high streaming currents even when the liquid conductivity is high. The reason for this is believed to be that there is no continuous path for the electricity back to the charge-separating surface.

Two other important factors in the production of static electricity are flowrate and surface area. Streaming current increases with flowrate, the factor being the linear flowrate to the power 1.75, and for this reason flowrate should be kept low. A maximum flowrate of 3 ft./sec. has been recommended when handling hazardous JP-4 jet fuel. Streaming current also increases with surface area. Filtration, an operation which depends on large surface area, produces very high currents especially if it is carried out at relatively high flow rates.

Many methods of reducing the hazard from static electricity have been proposed. Grounding of tanks and other equipment is partially effective. The charge on the surface of the tank is safely drained off to ground, but it takes time for the charge to relax, and before this can take place a hazardous spark may occur in the tank. The lower the conductivity of a liquid, the longer relaxation time it requires. The relaxation half-time $T_{1/2}$, the time in seconds required for one-half the charge to be drained off, depends on the electrical conductivity ($\sigma$ in mho/cm.) and dielectric constant, E (ca. 2 for hydrocarbons) of the liquid according to the formula $T_{1/2}=0.69EE_0/\sigma$, where $E_0$ is a constant $8.84\times10^{-14}$ farad/cm. (the "dielectric constant" of empty space). Thus, the half-time for a $10^{-15}$ conductivity hydrocarbon is about 130 seconds and for a $10^{-12}$ conductivity hydrocarbon, it is about 0.13 second. It can be seen that, especially for low conductivity liquids, a hazardous condition can exist for an appreciable period of time.

A grounded "relaxation" tank preceding a receiving tank has been proposed by several workers in the field. This is effective in removing the charge in the liquid at that point in the system, but does not take care of any charge generated subsequently in piping, valves, or tank inlets.

Radiation to increase the conductivity in the vapor space above a liquid has been studied. However, since increasing the vapor conductivity may increase the possibility of a spark, this method cannot be recommended.

Magnetic and electrostatic fields to drive the ions in a stream toward neutralizing electrodes have been tested, with indifferent results. Apparently, the fields that would be required for these methods to be successful are much too large to be practicable.

The addition of additives which increase the conductivity of the liquid and decrease its relaxation time has shown considerable promise. Once a liquid is in a tank, in bulk form, there is no doubt that a higher conductivity liquid will relax, or lose its charge to a grounded tank wall, faster than a lower conductivity liquid. On the other hand, since the higher conductivity liquid contains a greater concentration of ions, it will produce a higher streaming current. If there is no opportunity for this charge to relax prior to entering the tank, the net result of the addition of an additive may be a "pro-static" effect. This effect will be especially hazardous if spraying and misting of charged liquid occurs in the tank.

According to the present invention, liquids, that are charged with static electricity are neutralized by contact with an electrically conductive pointed electrode downstream from the zone of generation of the static charge. For example, a common pin or needle, and having its tip in contact with a liquid charged to many thousands of volts, will neutralize the charge in a very short time, generally in a matter of seconds and often in a fraction of a second, if the pin or needle is connected electrically to the pump, filter, pipe, etc. which is chiefly responsible for the static charge development in the first place.

In carrying out the invention, the pointed electrode is insulated electrically, except for the connection to the agitation zone or container. Where charged liquids are present in pipes, which is often the case in liquid handling systems, the insulation can consist of a section of insulating pipe; for example, glass or a low conductivity plastic such as polyethylene or polytetrafluoroethylene (Teflon), polyamide, polymethacrylate (Lucite) or polystyrene. Such insulation appears to be necessary for the proper functioning of the pointed electrode.

It is also necessary, if the electrode is to be very efficient in neutralizing the charged liquid, that the pointed electrode be spaced apart from other electrically conducting materials, particularly grounded metals. The required spacing is not very great, in many cases being a matter of inches, but it is quite desirable. For example, a pointed electrode in a grounded metal pipe through which statically charged liquid is flowing gives practically no more neutralization than the pipe itself, and furthermore, an electrode in a glass pipe covered with a grounded metal sheath is an inefficient neutralizer.

The pointed electrode is far more efficient than a grounded vessel or pipe, despite the fact that the latter are actually the equivalent of Faraday ice pails which immediately transfer all charges to their outside surfaces. Neutralization in a grounded vessel or pipe follows the "relaxation" formula discussed earlier, but neutralization with a pointed electrode appears to have an entirely different mechanism. The so-called "pin effect" of the pointed electrodes is a most effective method of neutralizing charged liquids. Generally, substantially neutral or over-neutralized liquids can be obtained, and over-neutralization can be controlled by varying the position of the electrode point, by varying the capacitance between the electrode point and other conductive objects, and/or by varying the resistance between the electrode and the agitation zone.

More specifically to accomplish the minimizing and control of electrostatic charges and their accumulation, flammable liquid hydrocarbons having electrical conductivities of between about $1 \times 10^{-15}$ and about $1 \times 10^{-6}$ mho/cm. upon passing through a zone of agitation such as, for example, a pump, filter or conduit where such electrostatic charges are likey to build up, are treated in the following manner. The zone of agitaion is insulated against any contact with the ground. Subsequent to the agitation or even while such agitation still exists, the hydrocarbons are passed through a pipe also insulated with respect to the ground, the pipe being constructed of an essentially non-conducting material, for example, a plastic material. While in this subsequent stage, at least a portion of the liquid hydrocarbons come in contact with a pointed electrically conducting electrode which in turn is connected electrically to at least one prior zone of agitation. For example, a normally liquid hydrocarbon mixture, such as a jet fuel, is passed through a filter which is insulated from the ground and then through a polytetrafluoroethylene (Teflon) pipe. Positioned within the center portion of the pipe is a pointed metallic electrode which is electrically connected by means of a wire to the filter. A static charge normally will be built up by reason of the passage of the jet fuel through the filter. Such static charge does not build up to the danger point because the jet fuel contacts, at least in part, the downstream pointed electrode which in turn is connected electrically to the filter which originally and initally was the zone of agitation from which the static charge built up in the first place. The system, in effect, is a type of internal neutralization of streaming electron or static charge and effectively results in the effluent from the zone of agitation contacting the pointed pin electrode so as to substantially neutralize itself so far as static potential is concerned.

Several modifications of this system of preventing buildup of static charge are possible and are useful. For example, any and all zones of moving agitation within a system transporting or handling liquid hydrocarbons of low specific conductivity may be electrically connected with pin electrodes and the entire system may be insulated from the ground. In other words, a normal tank truck charging fuel to airplane fuel tanks will have a reservoir containing aviation or jet fuel. This reservoir will be connected to a pump which in turn has a conduit leading to a filter element. From the filter element a conduit will lead to a nozzle which in turn has its outlet in contact with the fuel tanks of the jet airplane. If, in such a system, the fuel pump and the filter are insulated from the ground and the conduits transporting the fuel are insulated from the ground or preferably are of insulating material, for example, synthetic rubber or plastic, such as polyethylene Tygon or Teflon, pin type electrodes which are of electrically conductive material may be positioned within one or more of the conduits. These pin electrodes are connected electrically with the preceding mechanism (pump, filter, etc.) which causes the moving agitation of the hydrocarbon fuel. In other words, pins inserted in the non-conducting tubing or conduits following the filter would be electrically connected to the filter. Pin electrodes inserted in conduits immediately following the pump would be electrically connected with each other and with the housing of the pump which in turn is electrically insulated from the ground.

The nature and substance of this invention will be more clearly understood by referring to the accompanying drawing in which:

FIG. 1 represents a generalized pumping or transfer system for flammable liquids which is provided with means including a conduit section of electrically non-conductive material according to this invention for the reduction of electrostatic charges;

FIG. 2 represents a view in longitudinal section through the electrically non-conductive conduit section of FIG. 1 between transverse sections 2—2 and 2'—2' thereof particularly showing the pin electrode provided in this conduit section according to the present invention, and FIG. 3 represents a view in longitudinal section through the flanged coupling of the storage tank outlet fitting and the pump of FIG. 1.

Referring now to the the drawing in detail, a storage tank 4 is filled to a level 6 with a flammable liquid. This storage tank is connected to a receiving tank 8 by means of outlet fitting 10, pump 12, conduit section 14, filter 16, conduit section 18, conduit section 20, conduit section 22, and inlet fitting 24. The receiving tank is filled to a level 26. Pump 12 and filter 16 have metal or electrically conductive casings. Likewise tanks 4 and 8, tank fittings 10 and 24, and all conduit sections except for section 20 are fabricated of electrically conductive material. In keeping with the present invention, section 20 is fabricated of an electrically non-conductive material such as one of the plastics mentioned hereinbefore.

Extending radically inwardly through the wall of conduit section 20 is a pin electrode 28. This electrode is in electrically wired connection with pump 12, conduit section 14, filter 16, and conduit section 18. Said in other words, pin electrode 28 is connected electrically with the principal components of the pumping system upstream of it wherein static charges are likely to be generated. Tanks 4 and 8 are grounded. The coupling between tank outlet fitting 10 and the suction side of pump 12, shown as a flanged coupling, should be made up with an electrically non-conductive gasket 30 between the flange faces and electrically non-conductive sleeves 32 around the coupling bolts 34. Such a coupling arrangement taken together with the electrically non-conductive nature of conduit section 20 will leave the assembly of pump 12, conduit section 14, filter 16, and conduit section 18 electrically insulated from ground.

The invention is useful for neutralizing static charges in flammable liquids having a wide range of electrical conductivities, from about $1 \times 10^{-15}$ to about $1 \times 10^{-6}$ mho/cm. It is especially useful with liquids having conductivities from about $1 \times 10^{-14}$ to $1 \times 10^{-10}$ mho/cm., since liquids in the low part of this range have long relaxation times and neutralize slowly by conventional relaxation methods, and liquids in the high part of this range often become charged by static electricity to extremely high levels. Furthermore, in this range are generally found the commercially available gasolines, jet fuels, kerosenes, diesel oils, and heating oils, per se, and additive blends thereof. Besides those already mentioned, liquids with which the present invention is useful include alcohols such as methanol, ethanol, and isopropanol; ketones such as acetone and methyl ethyl ketone; esters such as ethyl acetate and methyl methacrylate; hydrocarbons such as hexane, cyclohexane, diisobutylene, tripropylene, benzene, toluene and xylenes; and various other liquids including carbon disulfide.

The invention is illustrated further by the following examples, but the invention is not intended to be limited thereto.

*Example 1*

A filter system for the pumping and filtering of liquids was constructed as follows. A 12" x 18" 13-gallon storage tank was connected by means of a ½" internal diameter Nalgon plastic tubing to a pump having a capacity of 4 g.p.m. The pump outlet was connected by ½" internal diameter x 36" polyethylene tubing to a filter which consisted of glass wool in a 1" internal diameter x 4" stainless pipe, and then to ½" internal diameter 24" polyethylene tubing, the oulet of which discharged into the storage tank. About 3" downstream of the filter, a common nickel-plated brass pin having a sharp point was inserted so that the point was at about the centerline of the polyethylene tubing.

A series of three runs were carried out, in which heating oil of No. 2 grade having a conductivity of $1.2 \times 10^{-12}$ mho/cm. was filtered through 1.4 grams of glass wool. In the first run no connection (NC) was made to either the filter or the pin electrode, so that they were both insulated from ground. In the second run, the filter was electrically connected to the ground (G). In the third run, the insulated filter was electrically connected to the pin-pointed electrode. The following comparative data were secured. The streaming current entering the tank with the oil stream was measured by means of a micro-microammeter placed between the tank and ground.

| Run | Filter | Electrode | Tank Current, Amperes ($\times 10^8$) |
|---|---|---|---|
| A | NC | NC | 2.8 |
| B | G | NC | 8.0 |
| C | connected | | 0.21 |

It will be seen, first, that contrary to earlier suppositions grounding of the charge-separating filter not only did not reduce the tank current, but actually increased it. It will be seen further that connecting the insulated filter to the pointed electrode decreased the tank current substantially.

*Example 2*

Another series of runs was made using the equivalent described in Example 1 with the following changes: (*a*) two pin electrodes were employed, one being inserted in the polyethylene pipe 8" upstream of the filter, and the other inserted 5" downstream of the filter; (*b*) the pin tips were 0.5 mm. inside the pipes; (*c*) the polyethylene pipe was cut 2½" below the downstream pin and a length of copper pipe ½" internal diameter x 8" was inserted. This arrangement allowed comparative studies to be made on the neutralizing efficiency of the upstream pin, the downstream pin, and the pipe. In these experiments the filter contained 1.5 grams of glass wool and the liquid being filtered was a No. 2 heating oil having a conductivity of $8 \times 10^{-13}$ mho/cm. The results are shown in the following table:

| Run | Upstream Pin | Filter | Downstream Pin | Pipe | Tank Current, Amperes ($\times 10^7$) | Neutralization, Compared to Run D, percent |
|---|---|---|---|---|---|---|
| D | NC | G | NC | NC | −1.02 | |
| E | NC | G | NC | G | −0.9 | 25 |
| F | | | NC | NC | −0.7 | 42 |
| G | NC | | NC | | −0.45 | 62 |
| H | NC | G | G | NC | −0.2 | 83 |
| I | NC | | | NC | −0.026 | 98 |

NC and G symbols same as in Example 1.

Although the simple grounding of the pin-type electrodes resulted in a material reduction in the charge retained by the hydrocarbons, it will be seen that there was a still further reduction in the static charge retained by the hydrocarbons in the case where the electrode was connected to the insulated filter frame rather than to the ground. For all practical purposes a residual charge on the hydrocarbons after treatment and processing of only $0.026 \times 10^{-7}$ represents a practically complete removal of static charges to the point where there is no need to be concerned or to take precautions to avoid static spark discharge.

When it is realized that a static charge buildup of many thousands of volts can be accomplished over an exceedingly short period of time, i.e. in the order of 30 seconds or less depending on the moving agitation involved, it is indeed remarkable to be able to effectively and practically completely eliminate this potential hazard through the expedient of electrically connecting the pin electrode to the insulated filter. In other installations the pin electrode has been electrically connected to the frame of pumps insulated from the ground with the same surprising results. The pins or pointed electrodes may be made of any suitable electrically conducting metal or alloy. The useful metals and alloys include platinum, steel, bronze, aluminum, nickel, tungsten, piano wire, brass, Nichrome, etc. The point may be made by cutting the wire with wire cutters or using a pin and fine emery cloth to sharpen the points. Also, unused osmium-tipped phonograph needles are suitable for use as electrodes.

Fine platinum wire of 0.016" diameter was particularly useful.

Having now thus fully described and illustrated the character of the invention, what is desired to be secured by Letters Patent is:

1. The method of handling flammable liquids of the type which form explosive mixtures with air while enclosed in storage vessels, flow lines and the like, and which tend to develop dangerously high electrostatic charges in flowing through zones of moving agitation such as pumps, filters and the like, said method comprising passing said liquids through a zone of moving agitation which is insulated from the ground, subsequently contacting said agitated liquids with at least one pointed electrically conductive electrode insulated from the ground but electrically connected to at least one prior zone of moving agitation.

2. A process of reducing electrostatic charges in flammable liquid hydrocharbons of relatively low volatility such as permits formation of explosive mixtures with ambient atmosphere in enclosed storage, which hydrocarbons have an electrical conductivity of between about $1 \times 10^{-15}$ and about $1 \times 10^{-6}$ mho/cm. which comprises passing said liquids through a zone of moving agitation which is insulated from the ground, subsequently contacting said agitated hydrocarbons with at least one pointed electrically conductive electrode insulated from the ground but electrically connected to at least one prior zone of moving agitation.

3. A process as in claim 1 wherein the zone of moving agitation is a filtering operation.

4. A process as in claim 1 wherein the zone of moving agitation is a pumping operation.

5. A process as in claim 1 wherein the zone of moving agitation in a pipe through which said hydrocarbons are passed under sufficient velocity to agitate the hydrocarbon.

6. A process as in claim 1 wherein the electrode with which hydrocarbon is contacted in positioned within electrically non-conductive material.

7. A process as in claim 1 wherein said pumped liquid hydrocarbons are filtered through at least one filter insulated from the ground and wherein the electrode is electrically connected to said filter.

8. A process as in claim 1 wherein the hydrocarbons are aviation fuel.

References Cited in the file of this patent

UNITED STATES PATENTS

| | | |
|---|---|---|
| 940,428 | Chapman | Nov. 16, 1909 |
| 1,223,864 | French | Apr. 24, 1917 |
| 2,103,758 | Seyfried | Dec. 28, 1937 |
| 2,153,199 | Miller | Apr. 4, 1939 |
| 2,647,223 | Check | July 28, 1953 |
| 2,656,508 | Coulter | Oct. 20, 1953 |